United States Patent
Thomas et al.

(10) Patent No.: US 9,939,635 B2
(45) Date of Patent: Apr. 10, 2018

(54) METHOD FOR PROVIDING NOTIFICATION IN VIRTUAL REALITY DEVICE

(71) Applicant: Brillio LLC, Jersey City, NJ (US)

(72) Inventors: Renji Kuruvilla Thomas, Bangalore (IN); Gaurav Jain, Bangalore (IN); Venkat Kumar Sivaramamurthy, Bangalore (IN); Puneet Gupta, Bangalore (IN); Karthik Gopalakrishnan Vinmani, Bangalore (IN)

(73) Assignee: Brillio LLC, Jersey City, NJ (US)

( * ) Notice: Subject to any disclaimer, the term of this patent is extended or adjusted under 35 U.S.C. 154(b) by 111 days.

(21) Appl. No.: 15/143,258

(22) Filed: Apr. 29, 2016

(65) Prior Publication Data

US 2017/0248785 A1 Aug. 31, 2017

(30) Foreign Application Priority Data

Feb. 29, 2016 (IN) .............................. 201641006997

(51) Int. Cl.
*G09G 5/00* (2006.01)
*G02B 27/00* (2006.01)
*G08B 5/22* (2006.01)
*G02B 27/01* (2006.01)
*G06T 19/00* (2011.01)

(52) U.S. Cl.
CPC ....... *G02B 27/0093* (2013.01); *G02B 27/017* (2013.01); *G06T 19/006* (2013.01); *G08B 5/22* (2013.01)

(58) Field of Classification Search
CPC G02B 27/0093; G02B 27/017; G06T 19/006; G08B 5/22

USPC ............................................................ 345/8
See application file for complete search history.

(56) References Cited

U.S. PATENT DOCUMENTS

| | | | |
|---|---|---|---|
| 5,751,289 A | 5/1998 | Myers | |
| 5,900,849 A | 5/1999 | Gallery | |
| 8,615,383 B2 | 12/2013 | Dobbins et al. | |
| 2002/0191004 A1 | 12/2002 | Ebersole et al. | |
| 2011/0230263 A1 | 9/2011 | Ng | |
| 2013/0293586 A1 | 11/2013 | Kaino et al. | |
| 2013/0328928 A1* | 12/2013 | Yamagishi | G02B 27/017 345/633 |
| 2014/0160162 A1 | 6/2014 | Balachandreswaran et al. | |
| 2014/0198129 A1* | 7/2014 | Liu | G06F 3/04815 345/633 |
| 2014/0267420 A1 | 9/2014 | Schowengerdt et al. | |
| 2015/0094142 A1* | 4/2015 | Stafford | A63F 13/212 463/31 |

(Continued)

FOREIGN PATENT DOCUMENTS

WO 2013138700 A1 9/2013

*Primary Examiner* — Nicholas Lee
*Assistant Examiner* — Ngan T Pham Lu (57) ABSTRACT

Embodiments herein provide a method for providing a notification in a Virtual Reality (VR) device. The method includes detecting, by a processor, an obstacle in proximity to a user while VR content is displayed on a screen of the VR device worn by the user. Further, the method includes detecting, by the processor, a severity level of the obstacle based on at least one parameter. Further, the method includes providing, by a notification engine, a notification on a portion of the screen of the VR device based on the severity level.

22 Claims, 6 Drawing Sheets

(56) References Cited

U.S. PATENT DOCUMENTS

| | | |
|---|---|---|
| 2015/0123966 A1 | 5/2015 | Newman |
| 2015/0277119 A1 | 10/2015 | Wong et al. |
| 2015/0367231 A1 | 12/2015 | Kim |
| 2016/0034042 A1 | 2/2016 | Joo |

* cited by examiner

METHOD FOR PROVIDING NOTIFICATION IN VIRTUAL REALITY DEVICE

TECHNICAL FIELD

The embodiments herein relate to virtual reality (VR) systems, and more specifically, relates to a method for providing a notification in a VR device. The present application is based on, and claims priority from an Indian Application Number 201641006997 filed on 29 Feb. 2016, the disclosure of which is hereby incorporated by reference.

BACKGROUND

Generally, consider a scenario in which a user is viewing VR content while wearing a VR device on the user's head, the user usually has to be stationary and cannot see around. By wearing the VR device, the user only sees the content displayed on the VR device, while in the VR session and cannot see the real world. The user may bump into an obstacle around the user or may knock something off a desk when stretching his/her hand or moving the user's body while viewing the VR content.

In the conventional systems and methods, alerts are provided to the user when the obstacle is detected, involved in an immersive experience (i.e., viewing the VR content), by presenting a video of the obstacle within the immersive experience session in a VR environment. However, the conventional systems and methods provide same level or experience of alerts to all the users of the VR device. In an example, the conventional mechanisms either display the actual video of the obstacle. These obstacle alerts are not personalized for different users and are not dynamic in nature. Further, the alerts provided to the user are also disruptive to the immersive experience in the VR session.

SUMMARY

The principal object of the embodiments herein is to provide a method for providing a notification in a VR device.

Another object of the embodiments herein is to provide a method for detecting, by a processor, an obstacle in proximity to a user while VR content is displayed on a screen of the VR device worn by the user.

Another object of the embodiments herein is to provide a method for detecting, by the processor, a severity level of the obstacle based on at least one parameter.

Another object of the embodiments herein is to provide a method for providing, by a notification engine, a notification on a portion of the screen of the VR device based on the severity level.

Accordingly the embodiments herein provide a method for providing a notification in a VR device. The method includes detecting, by a processor, an obstacle in proximity to a user while VR content is displayed on a screen of the VR device worn by the user. Further, the method includes detecting, by the processor, a severity level of the obstacle based on at least one parameter. Further, the method includes providing, by a notification engine, a notification on a portion of the screen of the VR device based on the severity level.

In an embodiment, the method further includes tracking a movement of at least one of the user and the obstacle. Further, the method includes computing a distance between the obstacle and the VR device based on the movement of at least one of the user and the obstacle. Further, the method includes determining whether the distance meets a severity threshold. Further, the method includes providing a notification on a portion of the screen of the VR device based on the severity threshold.

In an embodiment, detecting the obstacle while the VR content is displayed on the screen of the VR device worn by the user including detecting a physical object in proximity to the user while the VR content is displayed on the screen of the VR device. Further, the method includes tracking a movement of at least one of the user and the physical object. Further, the method includes computing a distance between the object and the VR device based on the movement. Further, the method includes determining whether the distance meets an obstacle threshold. Further, the method includes detecting the obstacle in response to determining the distance meets the obstacle threshold.

In an embodiment, the obstacle threshold is dynamically defined based on at least one of user reflexes, user behavior, user feedback, and an expert system.

In an embodiment, the parameter is an output of at least one of an obstacle tracker, an obstacle detector, a movement detector, and a context engine.

In an embodiment, the notification is at least one of a visual notification, an audio notification, and a vibration notification.

In an embodiment, the notification is provided to alert the user about the obstacle a head of time.

Accordingly the embodiments herein provide a VR device for providing a notification. The VR device includes a memory and a processor configured to detect an obstacle in proximity to a user while VR content is displayed on a screen of the VR device worn by the user. Further, the processor configured to detect a severity level of the obstacle based on at least one parameter. Further, the VR device includes a notification engine configured to provide a notification on a portion of the screen of the VR device based on the severity level.

Accordingly the embodiments herein provide a computer program product comprising computer executable program code recorded on a computer readable non-transitory storage medium, the computer executable program code when executed causing the actions including detecting, by a processor, an obstacle in proximity to a user while a VR content is displayed on a screen of a VR device worn by the user. Further, the computer executable program code when executed causing the actions including detecting, by the processor, a severity level of the obstacle based on at least one parameter. Further, the computer executable program code when executed causing the actions including providing, by a notification engine, a notification on a portion of the screen of the VR device based on the severity level.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The terms "Screen" and "Display" are used interchangeably throughout the description.

The embodiments herein provide a method for providing a notification in a VR device. The method includes detecting an obstacle in proximity to a user while VR content is displayed on a screen of the VR device worn by the user. Further, the method includes detecting a severity level of the obstacle based on at least one parameter. Further, the method includes providing a notification on a portion of the screen of the VR device based on the severity level.

Unlike the conventional systems and methods, the proposed mechanism provides the notification in the VR device worn by the user who is in a VR session (i.e., viewing the VR content displayed on the screen of the VR device) without disrupting the user from immersive experience of the VR session. In another example, the proposed mechanism provides an audible notification to the user.

Unlike conventional systems and methods, in an augmented reality sessions, information is augmented onto the real world objects and displayed to the user. The user using an augmented reality device can see real world during the entire VR session. However, in Virtual Reality sessions, the user, cannot see any real world objects since the user is shown the virtual world content such as a 360 degree view of content. Therefore, in the Virtual Reality sessions, the user needs to be made aware of any potential real world obstacles while the user is experiencing the Virtual Reality session.

Referring now to the drawings, and more particularly to FIGS. 1 through 6, there are shown preferred embodiments.

Figure 1:
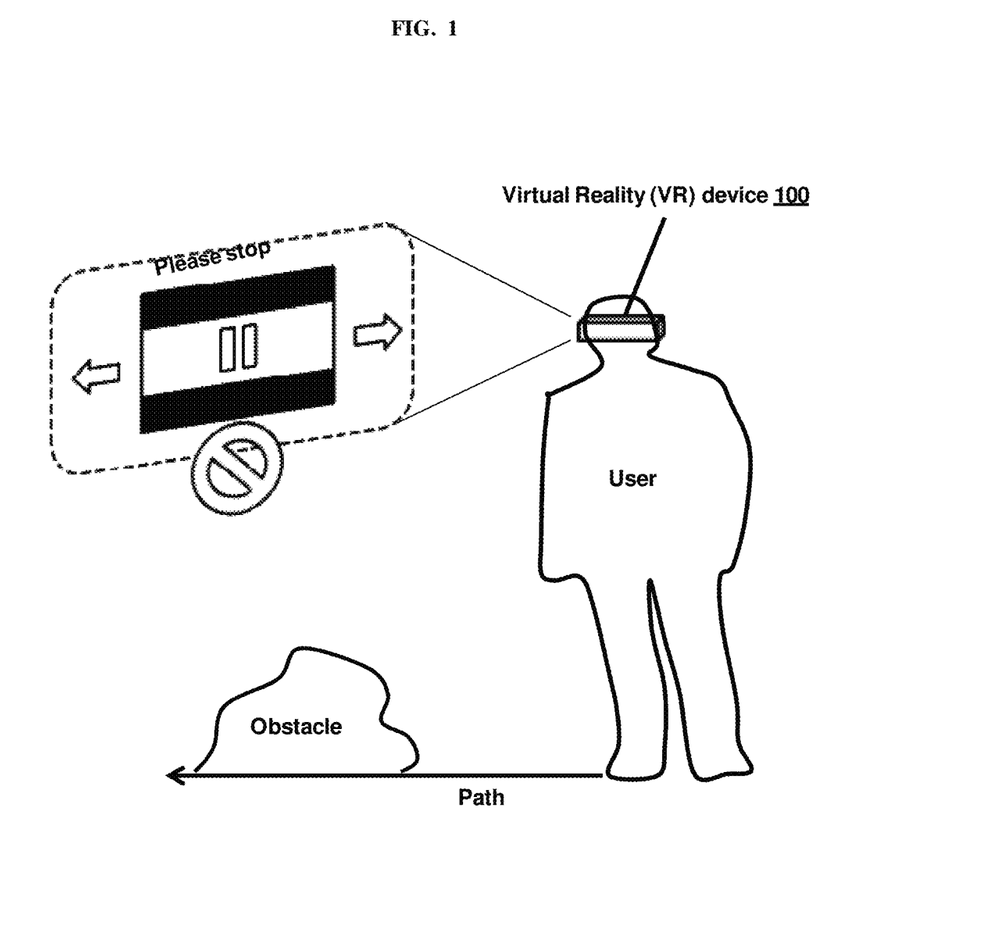
FIG. 1 illustrates an example system for providing a notification in a VR device, according to an embodiment disclosed herein.

FIG. 1 illustrates an example for providing a notification in a VR device, according to an embodiment as disclosed herein. In an embodiment, the VR device 100 is shown in the FIG. 1. In an example, the VR device 100 is a wearable display device, also sometimes called "head-mounted displays" (HMDs). The head-mounted display places a graphic display or displays close to one or both eyes of a wearer. To generate the images on a display, a computer processing system may be used. Such displays may occupy a wearer's entire field of view, or only occupy part of wearer's field of view. Further, the HMDs may be as small as a pair of glasses or as large as a helmet.

In the conventional systems and methods, when a user is viewing VR content on a portion of a screen of the VR device 100, the user has to be stationary and cannot see around. If the user moves then, there might be a hazard or an obstacle in his/her way. Thus, degrading the user experience and disrupting the user from an immersive experience.

Unlike the conventional systems and methods, as shown in the FIG. 1, consider a scenario where the user is viewing the VR content displayed on the screen of the VR device 100 worn by the user. While the user is viewing the VR content, the VR device 100 detects an obstacle in proximity to the user. After detecting the obstacle, the VR device 100 detects a severity level of the obstacle based on at least one parameter. In an embodiment, the parameter is an output of at least one of an obstacle tracking unit, an obstacle detecting unit, a movement detecting unit, and a context engine.

Further, the VR device 100 provides a notification on the portion of the screen based on the severity level. In an embodiment, the notification is at least one of a visual notification, an audio notification, a vibration notification, or the like. In an embodiment, the notification is provided to alert the user about the obstacle ahead of time. In an example, a text notification "PLEASE STOP" (i.e., visual notification) is displayed or presented on the portion of the screen of the VR device 100 as shown in the FIG. 1. After displaying the notification, the VR device 100 tracks a movement (i.e., actions performed, reflexes, or the like) of the user. On detecting the movement of the user, the VR device 100 computes a distance between the obstacle and the VR device 100.

Further, the VR device 100 determines whether the distance is within a severity threshold. If the distance is within the severity threshold then, the VR device 100 displays the notification on the portion of the screen. Unlike the conventional systems and methods, the notification of hazards or obstacles is presented to the user on the screen of the VR device 100 without hampering the user's immersive experience. Further, the proposed mechanism allows the user to experience the immersive content in a seamless way.

The FIG. 1 shows the example embodiment but it is to be understood that other embodiments are not limited thereon. In other embodiments, the example may include less or more number of VR devices.

Figure 2:
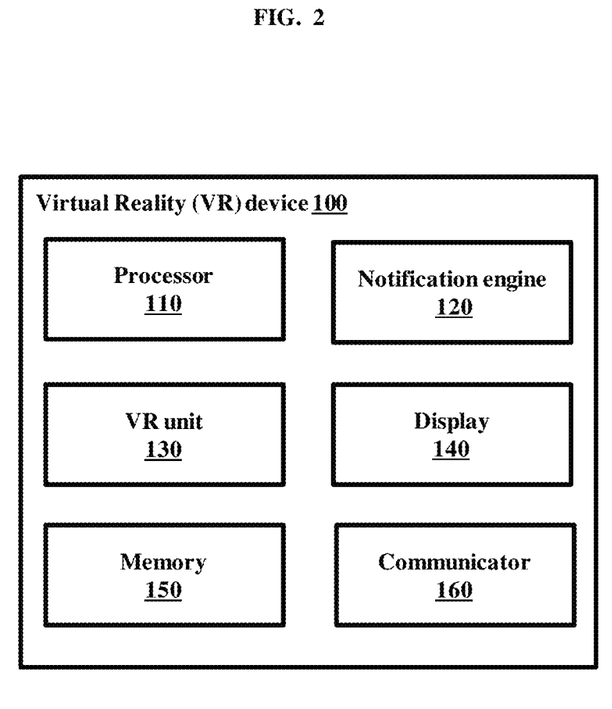
FIG. 2 illustrates various units of a VR device for providing a notification, according to an embodiment disclosed herein.

FIG. 2 illustrates various units of the VR device 100 for providing the notification, according to an embodiment disclosed herein. In an embodiment, the VR device 100 includes a processor 110, a notification engine 120, a VR unit 130, a display 140, a memory 150, and a communicator 160.

The processor 110 can be configured to detect a physical object in proximity to the user while the VR content is displayed on the screen (i.e., display 140) of the VR device 100. Further, the processor 110 can be configured to track a movement of at least one of the user and the physical object; and compute a distance between the physical object and the VR device 100 based on the movement of the user. Further, the processor 110 can be configured to determine whether the distance meets an obstacle threshold; and detect the obstacle after determining that the distance meets the obstacle threshold.

After detecting the obstacle, the processor 110 can be configured to detect a severity level of the obstacle based on the at least one parameter. In an embodiment, the parameter is the output of the at least one of the obstacle tracking unit, the obstacle detecting unit, a movement detecting unit, and a context engine. Based on the severity level of the obstacle, the notification engine 120 can be configured to provide the notification on the VR device 100. In an example, the notification is displayed on the screen using the display 140. In an embodiment, the notification is at least one of the visual notification, the audio notification, and the vibration notification. In an embodiment, the notification is provided to alert the user about the obstacle ahead of time. In an example, a video notification can be presented to the user on the portion of the screen of the VR device 100. In another example, an audio notification can be provided to the user. In another example, a pulse signal notification such as vibrations can be provided to the user.

In an embodiment, the processor 110 can be configured to track the movement of at least one of the user and the obstacle; and compute the distance between the obstacle and the VR device 100 based on the movement of at least one of the user and the obstacle. Further, the processor unit 100 can be configured to determine the distance meets a severity threshold. Based on the severity threshold, the notification engine 120 can be configured to provide the notification. Further, the notification selected is presented to the user via the VR unit 130 from the notification engine 120. In an example, if in case of the visual notification, it is displayed on the portion of the screen of the VR device 100. Further, the processor 110 can be configured to dynamically define the obstacle threshold based on at least one of user reflexes, user behavior, user feedback, and an expert system.

In an embodiment, the obstacle threshold is dynamically updated based on actions performed by the user once the notification (i.e., alert) is presented to the user. The notification is presented after detecting the obstacle for the past immersive sessions to personalize the threshold for that particular user. In another embodiment, different threshold values are assigned for different users. These different threshold values are assigned based on these user's reflexes (i.e., time taken to respond to the notification) tracked and the obstacle threshold for the different users is dynamically changed. In another embodiment, for a particular user, any improvements or degradation of the user's reflexes are tracked based on the learning or past data to dynamically change the obstacle threshold for the particular user.

The memory 150 may include one or more computer-readable storage media. The memory 150 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 150 may, in some examples, be considered a non-transitory storage medium. The term "non-transitory" may indicate that the storage medium is not embodied in a carrier wave or a propagated signal. However, the term "non-transitory" should not be interpreted that the memory 150 is non-movable. In some examples, the memory 150 can be configured to store larger amounts of information than the memory. In certain examples, a non-transitory storage medium may store data that can, over time, change (e.g., in Random Access Memory (RAM) or cache). The communicator 160 can be configured for communicating internally between the units.

The FIG. 2 shows the VR device 100 but it is to be understood that other embodiments are not limited thereon. In other embodiments, the VR device 100 may include less or more number of units. Further, the labels or names of the units are used only for illustrative purpose and does not limit the scope of the invention. One or more units can be combined together to perform same or substantially similar function in the VR device 100.

Figure 3:
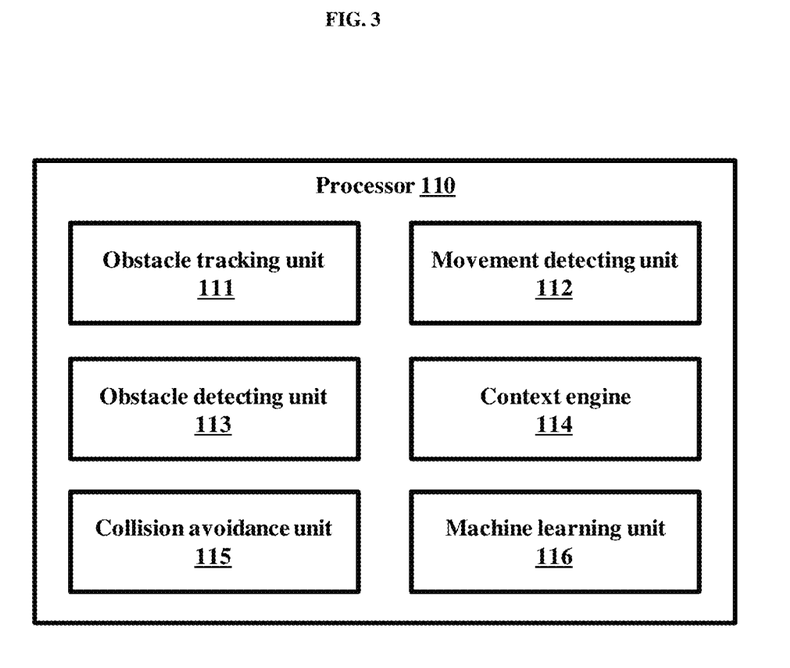
FIG. 3 illustrates various units of a processor, according to an embodiment disclosed herein.

FIG. 3 illustrates various units of the processor 110, according to an embodiment disclosed herein. In an embodiment, the processor 110 includes an obstacle tracking unit 111, a movement detecting unit 112, an obstacle detecting unit 113, a context engine 114, a collision avoidance unit 115, and a machine learning unit 116.

The obstacle tracking unit 111 can be configured to detect the physical object in proximity to the user while the VR content is displayed on the display 140 of the VR device 100. The movement detecting unit 112 can be configured to track the movement of at least one of the user and the physical object. Further, the movement detecting unit 112 can be configured to compute the distance threshold between the object and the VR device 100 based on the movement. Further, the movement detecting unit 112 can be configured to determine the distance meets the obstacle threshold. The obstacle detecting unit 113 can be configured to detect the obstacle in response to determining the distance meets the obstacle threshold.

After detecting the obstacle, the collision avoidance unit 115 can be configured to extract the obstacle threshold, the severity level of the obstacle, ambient noises, and reflexes from the context engine 114 to select the appropriate notification to be presented to the user. Further, the movement detecting unit 112 can be configured to determine the actions or movements of the user performed after presenting the notification to the user. In an embodiment, the parameters such as time taken for the user to react (i.e., reflexes), whether the reflex avoided collision, a type of notification (i.e., audible, visual, vibration, or the like) is fed to the machine learning unit 116. Further, the machine learning unit 116 can be configured to optimize the collision avoidance unit 115 thresholds for further processing thereby, improving accuracy and effectiveness of future collision avoidance instances.

The FIG. 3 shows the various units of the processor 110 but it is to be understood that other embodiments are not limited thereon. In other embodiments, the processor 110 may include less or more number of units. Further, the labels or names of the units are used only for illustrative purpose and does not limit the scope of the invention. One or more units can be combined together to perform same or substantially similar function in the processor 110.

Figure 4:
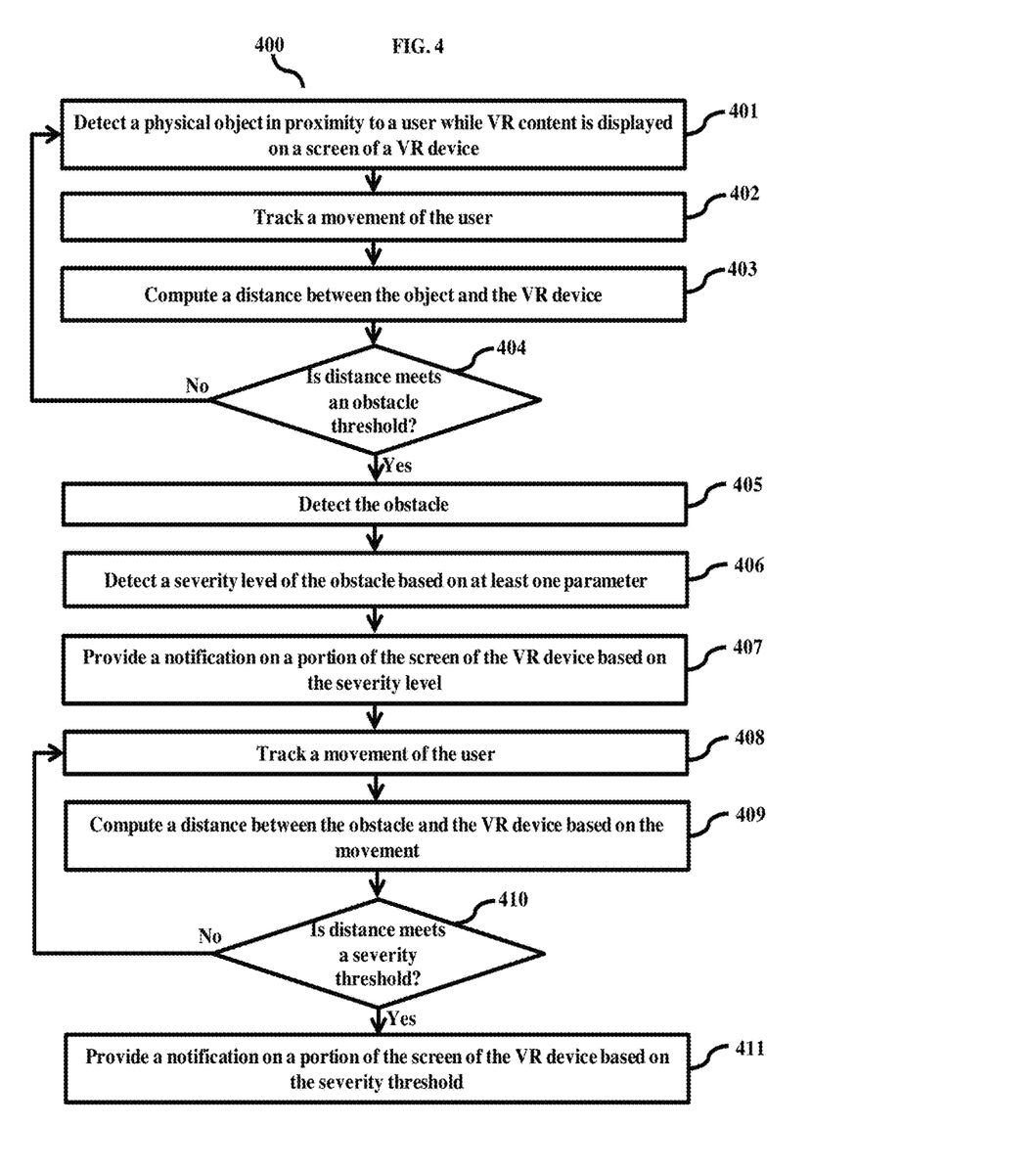
FIG. 4 is a flow diagram illustrating a method for providing a notification in a VR device, according to an embodiment disclosed herein.

FIG. 4 is a flow diagram 400 illustrating a method for providing the notification in the VR device 100, according to an embodiment disclosed herein. At step 401, the method includes detecting the physical object in proximity to the user while the VR content is displayed on the screen of the VR device 100. The method allows the processor 110 to detect the physical object in proximity to the user while the VR content is displayed on the screen of the VR device 100.

At step 402, the method includes tracking the movement of at least one of the user and the physical object. The method allows the processor 110 to track the movement of the user. At step 403, the method includes computing the distance between the object and the VR device 100. The method allows the processor 110 to compute the distance between the object and the VR device 100. If it is determined, at step 404, that the distance meets the distance threshold then, at step 405, the method includes detecting the obstacle. The method allows the processor 110 to detect the obstacle. If it is determined, at step 404, that the distance does not meet the distance threshold then, the method is looped back to step 401. In an embodiment, initially, the distance threshold for the user (i.e., safe distance for a human) can be pre-defined such as 1 meter. In an example, when the object is identified on the user path, the distance from the object to the user is computed. The system assumes by default for any object if the distance is greater than 1 meter (>1 meter) is safe and user moves further closer to the object.

At step 406, the method includes detecting the severity level of the obstacle based on the at least one parameter. The method allows the processor 110 to detect the severity level of the obstacle based on the at least one parameter. In an embodiment, the parameter is the output of the obstacle tracking unit, an obstacle detecting unit, a movement detecting unit, and a context engine.

At step 407, the method includes providing the notification on the portion of the screen of the VR device 100 based on the severity level. The method allows the notification engine 120 to provide the notification on the portion of the screen of the VR device 100 based on the severity level. At step 408, the method includes tracking the movement of at least one of the user and the obstacle. The method allows the processor 110 to track the movement of the user. At step 409, the method includes computing the distance between the obstacle and the VR device 100 based on the movement of at least one of the user and the obstacle. The method allows the processor 110 to compute the distance between the obstacle and the VR device 100 based on the movement.

If it is determined, at step 410, that the distance meets the severity threshold then, at step 411, the method includes providing the notification on the portion of the screen of the VR device 100 based on the severity threshold. The method allows the notification engine 120 to provide the notification on the portion of the screen of the VR device 100 based on the severity threshold. In an embodiment, the distance threshold for the user (i.e., the safe distance for the human), initially, is predefined to 1 meter. Further, the severity threshold is set as medium for all objects by default. In an example, consider a scenario where the user walks towards the object. Further, if the distance between the user and the object is less than 1 meter (<1 m), then the notification is presented to the user on the portion of the screen of the VR device 100. The user's reflexes (i.e., the change in path, an increase in the distance between the user and the object, stopping, or evading based on the notification are tracked after the notification is presented to the user. If none of the criteria is met as described above, the distance threshold is increased by 10%. The distance threshold is 1.1 meter. If the user terminates the VR session, then the severity of the object was high. For example, pre-learned objects such as fire, sharp edges, metallic objects, smote, etc. have high severity by default.

If it is determined, at step 410, that the distance does not meet the severity threshold then, the method is looped back to step 408. Further, after providing the notification on the portion of the screen, the obstacle threshold is dynamically defined based on at least one of the user reflexes, the user behavior, the user feedback, and the expert feedback.

In an example, consider a scenario where the user is stationary and viewing the VR content displayed on the screen of the VR device 100 worn by the user. Here the physical object is in motion. The movement of the physical object is tracked and the distance between the object and the VR device 100 is computed. If the distance meets the obstacle threshold, then the physical object is detected as the obstacle. After detecting the obstacle, the severity level of the obstacle based on the at least one parameter is computed. Based on the severity level, the notification is provided on the portion of the screen of the VR device 100.

In another example, consider a scenario where the distance threshold is pre-determined and set as 1 meter. After detecting the object at the distance of 1 meter from the user, the notification is presented to the user depending on the severity level of the object. Further, after presenting the notification, the user's reflexes are determined. Based on the user's reflexes the distance threshold is either increased or decreased. If the user performs the action at 0.9 meters of distance, then it is treated as good reflexes but the distance threshold is updated to 1.1 meter. If the user takes the action at 0.5 m of distance, then it is treated as bas reflex and the distance threshold is updated to 1.5 meter. The distance threshold is updated in such a manner to ensure the user takes the action at 1 meter. At any instance, the distance threshold is determined as a weighted average of the past distances the user acted on.

Further, the user's reflexes are tracked to dynamically change the obstacle threshold. Initially, consider the obstacle threshold to be 0.8. If the user's reflexes are very fast then the obstacle threshold is dynamically changed to a value (<0.8) less than the earlier value. Alternatively, if the user's reflexes are very slow then the obstacle threshold is dynamically changed to a value (>0.8) greater than the earlier value. Similarly, the above process can be followed in case of the user is in motion and the object is stationary.

In another example, consider a scenario where the user and the physical object are in motion. Further, the user is viewing the VR content displayed on the screen of the VR device 100 worn by the user. A relative speed between the user and the physical object is calculated to determine the distance between the object and the VR device 100. If the distance meets the obstacle threshold then the physical object is detected as the obstacle. After detecting the obstacle, the severity level of the obstacle based on the at least one parameter is computed. Based on the severity level, the notification is provided on the portion of the screen of the VR device 100.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5:
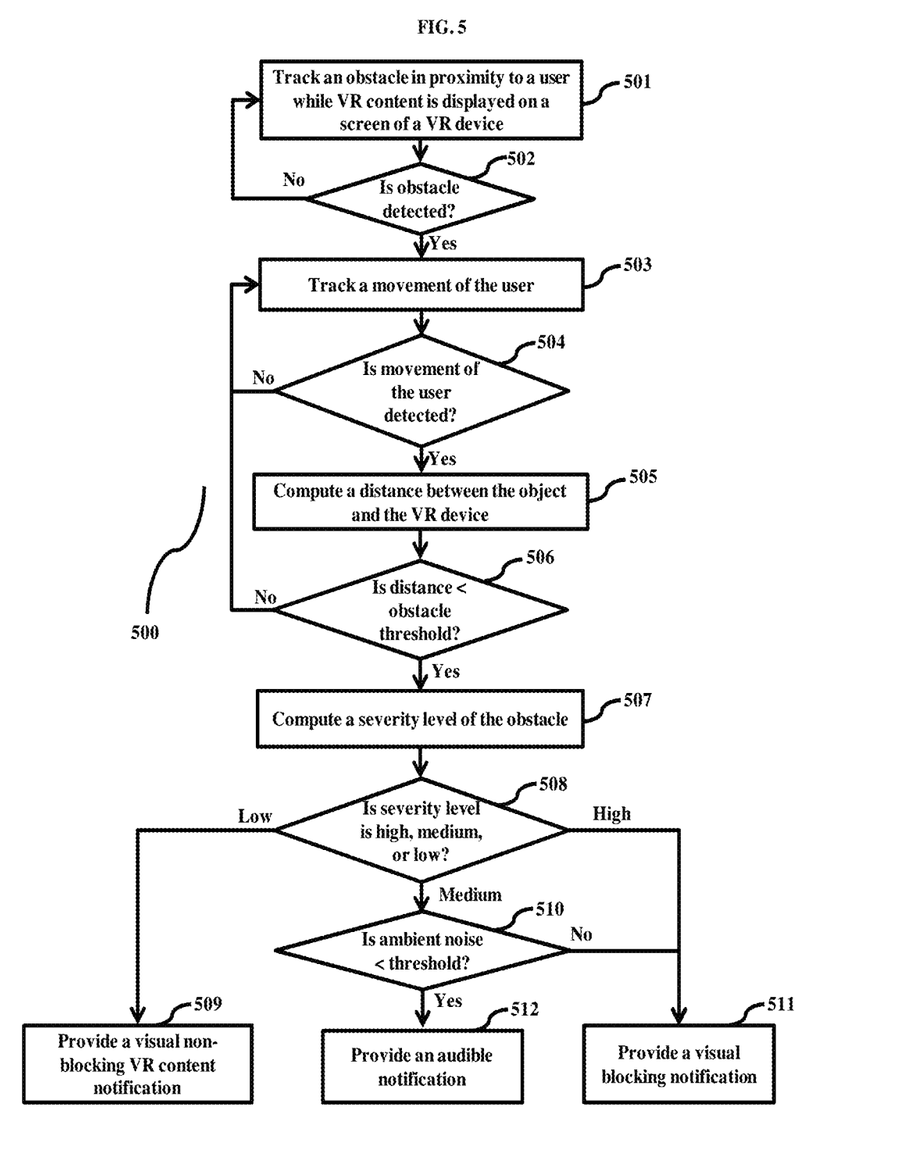
FIG. 5 is a flow diagram illustrating a method for providing a notification in a VR device based on a severity level of an obstacle, according to an embodiment disclosed herein.

FIG. 5 is flow diagram 500 illustrating a method for providing the notification in the VR device 100 based on the severity level of the obstacle, according to an embodiment disclosed herein. At step 501, the method includes tracking the obstacle in proximity to the user while the VR content is displayed on the screen of the VR device 100. The method allows the processor 110 to track the obstacle in proximity to the user while the VR content is displayed on the screen of the VR device 100.

If it is determined, at step 502, that the obstacle is detected then, at step 503, the method includes tracking the movement of the user. The method allows the processor 110 to track the movement of at least one of the user and the obstacle. If it is determined, at step 502, that the obstacle is not detected then, the method is looped back to step 501. If it is determined, at step 504, that the movement of the user is detected then, at step 505, the method includes computing the distance between the object and the VR device 100. The method allows the processor 110 to compute the distance between the object and the VR device 100. If it is determined, at step 504, that the movement of the user is not detected then, the method is looped back to step 503.

If it is determined, at step 506, that the distance is less than (i.e., meets) the obstacle threshold then, at step 507, the method includes computing the severity level of the obstacle. The method allows the processor 110 to compute the severity level of the obstacle. If it is determined, at step 506, that the distance exceeds the obstacle threshold then, the method is looped back to step 503.

If it is determined, at step 508, that the severity level of the obstacle is low then, at step 509, the method includes providing a visual non-blocking VR content notification (i.e., visual notification) on the portion of the screen of the VR device 100. The method allows the notification engine 120 to provide the visual non-blocking VR content notification (i.e., visual notification) on the portion of the screen of the VR device 100.

If it is determined, at step 508, that the severity level of the obstacle is medium then, at step 510, the method includes determining whether the ambient noise is less than an ambient threshold value. If it is determined, at step 510, that the ambient noise is not less than the ambient threshold value then, at step 511, the method includes providing a visual VR content blocking notification on the portion of the screen of the VR device 100. The method allows the notification engine 120 to provide the visual VR content blocking notification on the portion of the screen of the VR device 100. If it is determined, at step 510, that the ambient noise is less than the ambient threshold value then, at step 512, the method includes providing the audible notification. The method allows the notification engine 120 to provide the audible notification.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 6:
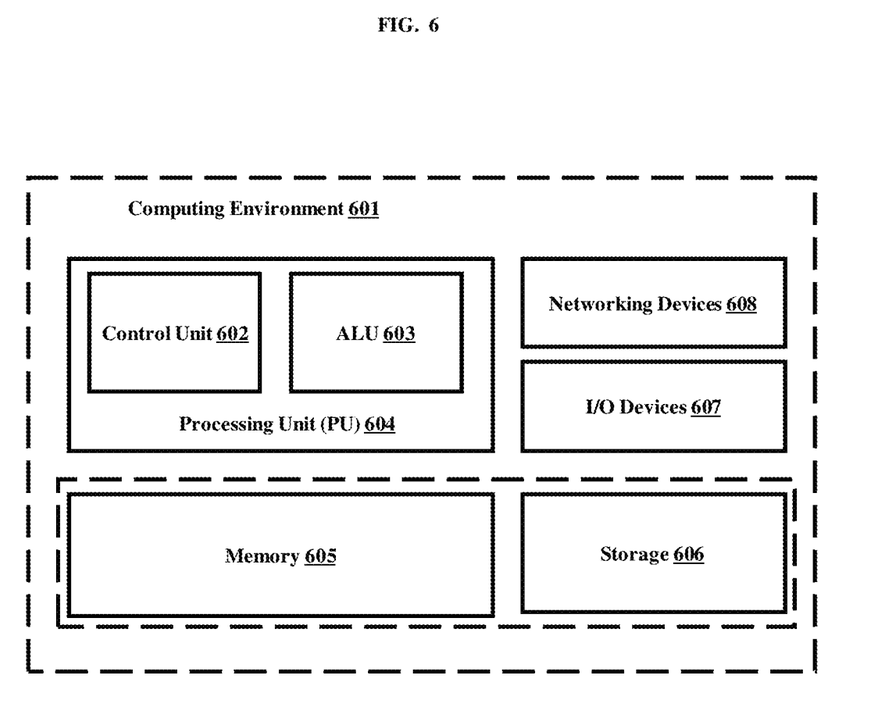
FIG. 6 illustrates a computing environment implementing a system and method for providing a notification in a VR device, according to an embodiment as disclosed herein.

FIG. 6 illustrates a computing environment implementing the method and system for providing the notification in the VR device 100, according to an embodiment as disclosed herein. As depicted in the FIG. 6, the computing environment 601 comprises at least one processing unit 604 that is equipped with a control unit 602 and an Arithmetic Logic Unit (ALU) 603, a memory 605, a storage unit 606, plurality of networking devices 608 and a plurality Input output (I/O) devices 607. The processing unit 604 is responsible for processing the instructions of the schemes. The processing unit 604 receives commands from the control unit 602 in order to perform its processing. Further, any logical and arithmetic operations involved in the execution of the instructions are computed with the help of the ALU 603.

The overall computing environment 601 can be composed of multiple homogeneous or heterogeneous cores, multiple CPUs of different kinds, special media and other accelerators. The processing unit 604 is responsible for processing the instructions of the schemes. Further, the plurality of processing units 604 may be located on a single chip or over multiple chips.

The scheme comprising of instructions and codes required for the implementation are stored in either the memory unit 605 or the storage 606 or both. At the time of execution, the instructions may be fetched from the corresponding memory 605 or storage 606, and executed by the processing unit 604.

In case of any hardware implementations various networking devices 608 or external I/O devices 607 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 6 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for providing a notification in a Virtual Reality (VR) device, the method comprising:
    detecting, by a processor, an obstacle in proximity to a user while a VR content is displayed on a screen of the VR device worn by the user based on an obstacle threshold, wherein the obstacle threshold is dynamically determined based on user reflexes indicating a response of the user for at least one of the obstacle and notifications in a past session;
    computing, by the processor, a severity level of the obstacle based on at least one parameter; and
    providing, by a notification engine, a first notification on a portion of the screen of the VR device based on the severity level.

2. The method of claim 1, wherein the method further comprising:
    tracking, by the processor, a movement of at least one of the user and the obstacle;
    computing, by the processor, a distance between the obstacle and the VR device based on the movement of at least one of the user and the obstacle;
    determining, by the processor, whether the distance meets a severity threshold; and
    providing, by the notification engine, a second notification on a portion of the screen of the VR device based on the severity threshold.

3. The method of claim 2, wherein the second notification is provided to alert the user about the obstacle ahead of time to avoid collision of the user with the obstacle, wherein a type of the second notification is dynamically determined based on an ambient noise around the user, the user reflexes, the severity level of the obstacle, the obstacle threshold, and the severity threshold.

4. The method of claim 2, further comprising:
detecting by the processor a user reflex indicating a time taken by the user to respond to the second notification and a response of the user to the second notification; and
dynamically updating by the processor the obstacle threshold and the severity threshold based on the user reflex for the second notification.

5. The method of claim 1, wherein detecting, by the processor, the obstacle while the VR content is displayed on the screen of the VR device worn by the user comprising:
detecting a physical object in proximity to the user while the VR content is displayed on the screen of the VR device;
tracking a movement of at least one of the user and the physical object;
computing a distance between the object and the VR device based on the movement;
dynamically determining the obstacle threshold based on the user reflexes;
determining that the distance meets the obstacle threshold; and
detecting the obstacle in response to determining the distance meets the obstacle threshold.

6. The method of claim 1, wherein at least one of improvement and degradation of the user reflexes are dynamically tracked based on learning from at least one of a time taken by the user to respond to notification, a current response of the user for the obstacle and the past response of the user for the obstacle.

7. The method of claim 1, wherein the parameter is an output of an obstacle tracker, an obstacle detector, a movement detector, and a context engine.

8. The method of claim 1, wherein the first notification is at least one of a visual notification, an audio notification, and a vibration notification and is provided to alert the user about the obstacle ahead of time to avoid collision of the user with the obstacle, wherein a type of the first notification is dynamically determined based on an ambient noise around the user, the user reflexes, the severity level of the obstacle and the obstacle threshold.

9. The method of claim 1, further comprising:
detecting by the processor a user reflex indicating a time taken by the user to respond to the first notification and a response of the user to the first notification; and
dynamically updating by the processor the obstacle threshold based on the user reflex for the first notification.

10. A Virtual Reality (VR) device for providing a notification, the VR device comprising:
a memory;
a processor configured to:
detect an obstacle in proximity to a user while a VR content is displayed on a screen of the VR device worn by the user based on an obstacle threshold, wherein the obstacle threshold is dynamically determined based on user reflexes indicating a response of the user for at least one of the obstacle and notifications in a past session; and
detect a severity level of the obstacle based on at least one parameter; and
a notification engine configured to provide a first notification on a portion of the screen of the VR device based on the severity level.

11. The VR device of claim 10, wherein the processor unit is further configured to:
track a movement of at least one of the user and the obstacle;
compute a distance between the obstacle and the VR device based on the movement of at least one of the user and the obstacle; and
determine whether the distance meets a severity threshold; and
provide a second notification on a portion of the screen of the VR device based on the severity threshold.

12. The VR device of claim 11, wherein the second notification is provided to alert the user about the obstacle ahead of time to avoid collision of the user with the obstacle, wherein a type of the second notification is dynamically determined based on an ambient noise around the user, the user reflexes, the severity level of the obstacle, the obstacle threshold, and the severity threshold.

13. The VR device of claim 11, wherein the processor is further configured to:
detect a user reflex indicating a time taken by the user to respond to the second notification and a response of the user to the second notification; and
dynamically update the obstacle threshold and the severity threshold based on the user reflex for the second notification.

14. The VR device of claim 10, wherein detect the obstacle while the VR content is displayed on the screen of the VR device worn by the user comprises:
detect a physical object in proximity to the user while the VR content is displayed on the screen of the VR device;
track a movement of at least one of the user and the physical object;
compute a distance between the object and the VR device based on the movement;
dynamically determine the obstacle threshold based on the user reflexes;
determine that the distance meets the obstacle threshold; and
detect the obstacle in response to determining the distance meets the obstacle threshold.

15. The VR device of claim 10, wherein at least one of improvement and degradation of the user reflexes are dynamically tracked based on learning from at least one of a time taken by the user to respond to notification, a current response of the user for the obstacle and the past response of the user for the obstacle.

16. The VR device of claim 10, wherein the parameter is an output of an obstacle tracker, an obstacle detector, a movement detector, and a context engine.

17. The VR device of claim 10, wherein the first notification is at least one of a visual notification, an audio notification, and a vibration notification and is provided to alert the user about the obstacle ahead of time to avoid collision of the user with the obstacle, wherein a type of the first notification is dynamically determined based on an ambient noise around the user, the user reflexes, the severity level of the obstacle and the obstacle threshold.

18. The VR device of claim 10, wherein the processor is further configured to:

detect a user reflex indicating a time taken by the user to respond to the first notification and a response of the user to the first notification; and dynamically update the obstacle threshold based on the user reflex for the first notification.

19. A computer program product comprising computer executable program code recorded on a computer readable non-transitory storage medium, said computer executable program code when executed causing the actions including:

detecting an obstacle in proximity to a user while a Virtual Reality (VR) content is displayed on a screen of a VR device worn by the user;

detecting a severity level of the obstacle based on at least one parameter;

providing a notification on a portion of the screen of the VR device based on the severity level;

detecting a user reflex indicating a time taken by the user to respond to the notification displayed on the portion of the screen of the VR device and a response of the user to at least one of the obstacle and the notification; and dynamically updating the obstacle threshold based on the user reflex.

20. A method for providing a notification in a Virtual Reality (VR) device, the method comprising:

detecting, by a processor, an obstacle in proximity to a user while a VR content is displayed on a screen of the VR device worn by the user based on an obstacle threshold;

determining a type of a first notification to be provided to the user based on an ambient noise around the user, user reflexes, a severity level of the obstacle and the obstacle threshold;

providing, by a notification engine, the determined type of the first notification on a portion of the screen of the VR device to avoid collision of the user with the obstacle;

detecting by the processor a user reflex indicating a time taken by the user to respond to the first notification and a response of the user to the first notification; and dynamically updating by the processor the obstacle threshold based on the user reflex for the first notification.

21. The method of claim 20, wherein the obstacle threshold is dynamically determined based on the user reflexes indicating a response of the user for the obstacle in a past session, wherein the user reflexes are dynamically tracked based on learning from at least one of current response of the user for the obstacle and the past response of the user for the obstacle, herein at least one of improvement and degradation of the user reflexes are dynamically tracked based on learning from at least one of a time taken by the user to respond to notification, a current response of the user for the obstacle and the past response of the user for the obstacle.

22. The method of claim 20, further comprising:

determining, by the processor, whether a distance between the obstacle and the VR device meets a severity threshold; and determining a type of a second notification to be provided to the user based on an ambient noise around the user, user reflexes, a severity level of the obstacle and the severity threshold;

providing, by a notification engine, the determined type of the second notification on a portion of the screen of the VR device to avoid collision of the user with the obstacle;

detecting by the processor a user reflex indicating a time taken by the user to respond to the second notification and a response of the user to the second notification; and dynamically updating by the processor the obstacle threshold and the severity threshold based on the user reflex for the second notification.

* * * * *